Dec. 23, 1930. J. P. GLASBY, JR 1,786,236
AIRCRAFT WING
Original Filed Nov. 17, 1925   3 Sheets-Sheet 1
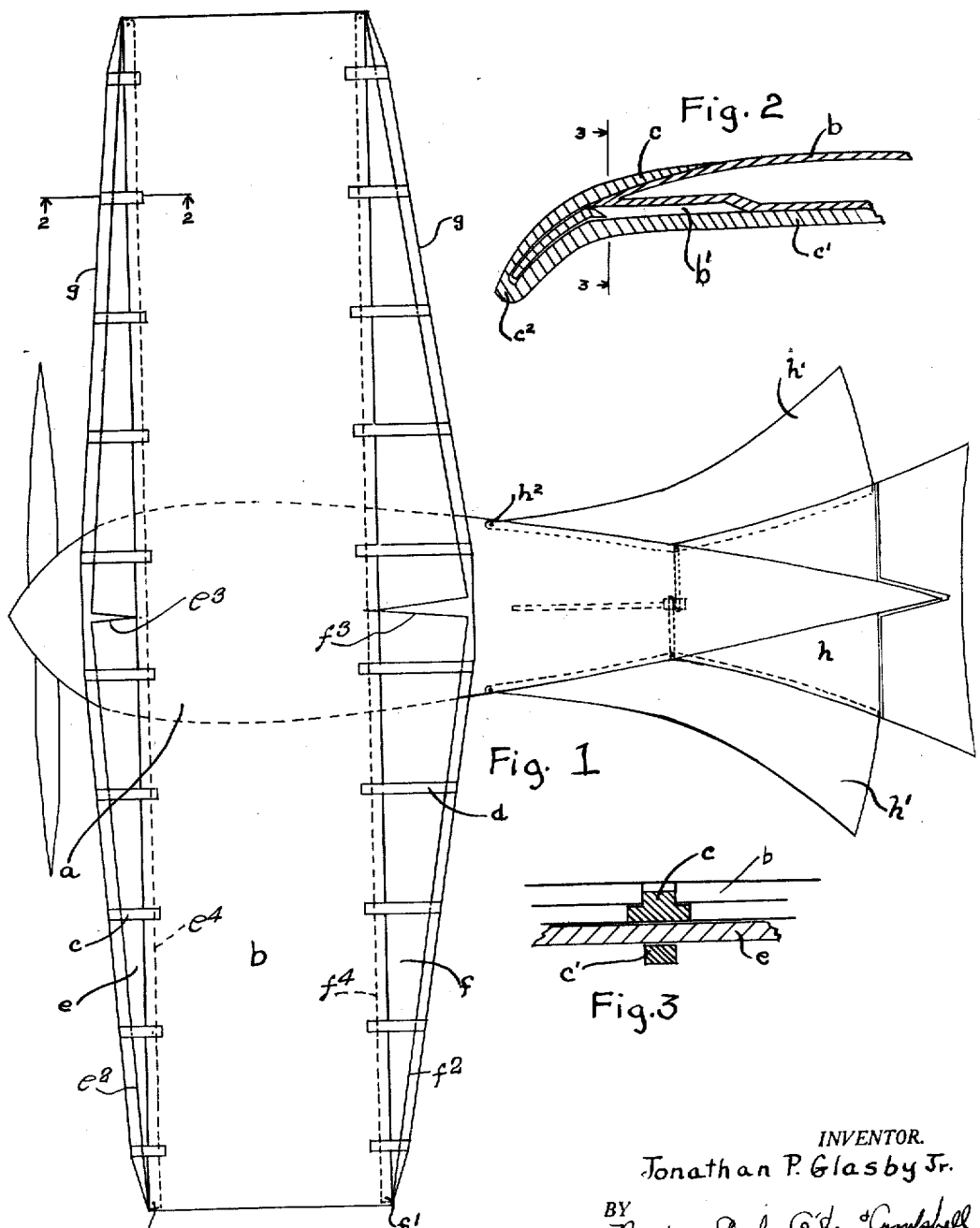
INVENTOR.
Jonathan P. Glasby Jr.

Dec. 23, 1930.    J. P. GLASBY, JR    1,786,236
AIRCRAFT WING
Original Filed Nov. 17, 1925    3 Sheets-Sheet 2
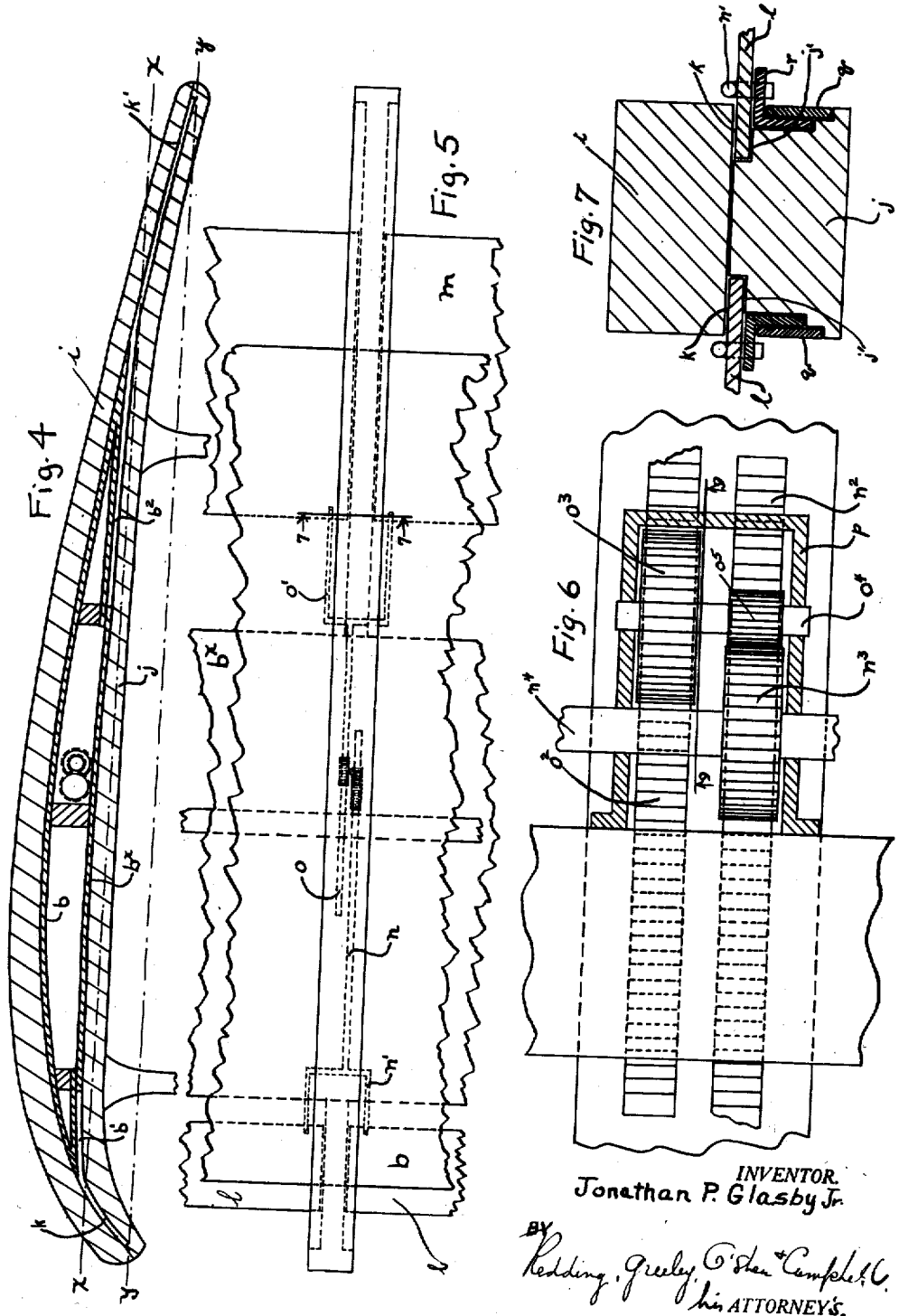
INVENTOR.
Jonathan P. Glasby Jr.

Dec. 23, 1930.   J. P. GLASBY, JR   1,786,236
AIRCRAFT WING
Original Filed Nov. 17, 1925   3 Sheets-Sheet 3
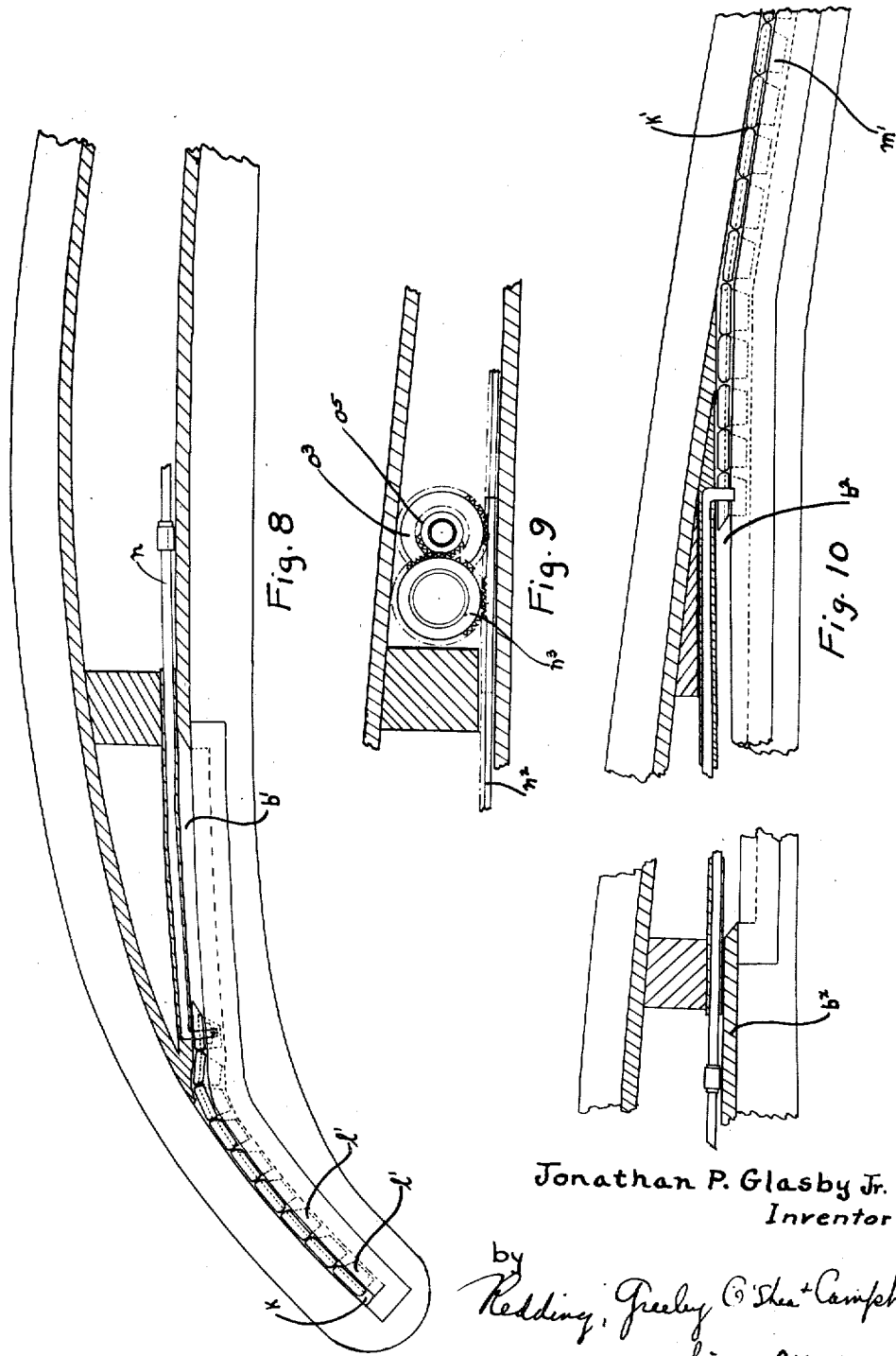
Jonathan P. Glasby Jr.
Inventor
by Redding, Greeley, O'Shea & Campbell
his Attorneys Patented Dec. 23, 1930

1,786,236

UNITED STATES PATENT OFFICE

JONATHAN P. GLASBY, JR., OF VERONA, NEW JERSEY

AIRCRAFT WING

Application filed November 17, 1925, Serial No. 69,570. Renewed June 28, 1929.

The desired condition in aeroplane practice today is the provision of a plane which is capable of a high rate of speed. While traveling at a high rate of speed reliance is placed upon the propulsion of the engine and a supporting surface or wing of relatively small area and camber is all that is necessary. Such a relation is impractical, however, from practical considerations at landing or taking off because with a wing of small camber and small area the plane has to attain so great a speed before it can leave the ground that an extended landing field is required. Increasing the camber and area of the wing surface increases the lifting power of the plane and proportionately decreases the speed due to the increase in head resistance or drag and in consequence a shorter flying field may be availed of to permit the plane to take off or land. Planes are designed to carry a predetermined load at a predetermined speed and the angle of incidence of the wing is determined by the load and speed for which the plane is designed. In consequence a lightening of the load does not permit of the attainment of a high rate of speed. The angle of incidence is dependent upon the type of aeroplane, that is, whether it is designed for speed or for load carrying and this angle of incidence must be constant, from mechanical considerations, for the respective types of planes.

The object of the present invention is to permit a variation in the area and camber of a wing surface while maintaining the angle of incidence constant in order to permit of the attainment of high rates of speed in flight or, during flight, an increase of speed upon a decrease of the load, while at the same time permitting the aeroplane to land and take off at a slower speed. To this end the supporting surface comprises a leading edge section and a trailing edge section relatively movable with respect to the main supporting surface in such manner that the leading and trailing edges of the wing lie always in a plane parallel to a plane including the chords of the wing camber.

Two conceptions of the invention are illustrated in the accompanying drawings by either of which the object of the invention may be attained. According to one modification the relatively movable sections forwardly and rearwardly of the main supporting surface are pivoted adjacent the outer extremities of the wings and are movable from a position entirely within the wing structure to an extreme position wherein the area of the wing is increased. While the angle of incidence of a given wing is constant throughout its spread the camber of the wing may, in some situations, decrease from the mid-portion to the tips. As an aeroplane moves through the air the flow of air adjacent the mid-portion of the wing is substantially parallel to the median line of the aeroplane and affords the maximum lift, while the air adjacent the tips of the wing is forced out laterally by the interferences of the moving plane thus decreasing the lifting efficiency of the wing tips. For this reason, according to one aspect of the present invention, the area of the wing at the center of the plane is increased to the maximum increase of lifting while no increase in area at the tips of the wings is provided since that portion of the wing serves in effect as a stabilizing medium and contributes little to the lifting power of the wing.

According to another modification of the invention the relatively movable sections are slidable within the wing structure to increase or decrease the area and camber of the wing. Such sections may be moved simultaneously the same or varying distances whereby the camber of the wing as in the previously discussed modification varies from the center toward the end. In planes of great wing spread, it may be found advantageous to combine the two concepts whereby pivoted wing sections may be disposed adjacent the extremities of the wing while slidable sections may be disposed adjacent the center of the span. More particularly a main or fixed portion of the wing is cambered for use at high speed, i. e. almost stream line, whereby little resistance or lifting is afforded. Spaced ribs disposed on the upper and lower surfaces of the central section continue the curve of the leading and trailing edges. Flexible or articulated sections are movable between the ribs to increase or decrease the area, lift and head resistance of the wing whereby the speed and lifting power of the aeroplane may be varied at will. In the illustrated embodiment the sections are relatively movable through the instrumentality of rack and pinion mechanism actuated from the pilot seat.

In order that the invention may be clearly understood and readily carried into effect the same will now be described more fully with reference to the accompanying drawings illustrating preferred embodiments thereof and in which:

Figure 1 is a view in plan showing an aeroplane to which the invention is applied, slidable leading and trailing edges being illustrated as pivoted adjacent the extremities of the wing, similarly pivoted surfaces adapted to increase the area of the tail planes being also shown.

Figure 2 is a detail sectional view taken in the plane indicated by the line 2—2 in Figure 1 and looking in the direction of the arrows and showing the manner in which the ribs are continued beyond the main wing section to provide a guide for a flexible leading edge section.

Figure 3 is a fragmentary sectional view taken in the plane indicated by the line 3—3 in Figure 2 and looking in the direction of the arrows and showing the relation of the ribs and the relatively movable wing sections.

Figure 4 is a view showing a second modification of the invention wherein individual sections are slidable with respect to a main relatively stationary section and this view also indicates the manner in which the plane including the wing edges remains parallel to the chordal line of the wing at the various positions which may be taken by the movable sections.

Figure 5 is a fragmentary view of a wing section according to Figure 4 looking from the top in that figure and showing the guiding mechanism for the respective sections.

Figure 6 is a view on an enlarged scale showing the actuating mechanism for the sections.

Figure 7 is a fragmentary sectional view taken in the plane indicated by the line 7—7 in Figure 5 and looking in the direction of the arrows and showing the ribs serving as guides for the slidable sections together with a track-way within which the slides travel.

Figure 8, is a view similar to Figure 4 but on an enlarged scale and showing only the front portion of the wing and, in detail, the construction of the slide.

Figure 9 is a fragmentary longitudinal sectional view in elevation showing the actuating mechanism for the movable surfaces taken in the plane indicated by the line 9—9 in Figure 6, and looking in the direction of the arrows.

Figure 10 is a fragmentary view showing the slidable surfaces at the rear edge of the wing.

Referring first to Figure 1 the fuselage of an aeroplane is indicated at $a$ and a supporting surface relatively stationary with respect to the fuselage is indicated at $b$. Extending forwardly and rearwardly from the supporting surface $b$ are a plurality of ribs, the upper ones of which are indicated at $c$ at the front of the wing and at $d$ at the rear thereof. Immediately beneath ribs $c$ and $d$ are complementary ribs $c'$ at the forward part of the wing and, similarly, complementary ribs, not shown, are disposed immediately beneath the ribs $d$. In Figure 2 the relation of parts are clearly indicated and the ribs $c, c'$ at the front of the machine are shown as joined at the extreme forward point $c^2$. Between the spaced ribs $c, c'$ are disposed flexible leading sections $e$, one on each side of the fuselage and pivoted respectively to the stationary wing section $b$ as at $e'$, and trailing sections $f$, one on each side of the fuselage and pivoted, respectively, to the stationary wing section as at $f'$. These movable flexible sections $e$ and $f$ are preferably substantially triangular in form as shown by the full lines $e^2$, $e^3$ or $f^2$, $f^3$ and dotted lines $e^4$ or $f^4$ and are adapted to be reciprocated within a recessed portion $b'$ at the front of the wing and a similar recessed portion at the rear edge of the wing in order to reduce the area of the supporting surface. The wing sections $e$ and $f$ are so disposed that their portions of greatest width are adjacent the median line of the plane to take advantage of the greater lifting capacity at that point and it will be observed that the ribs $c$ and $d$ increase in length, respectively, as they approach the median line. Bracing elements such as are indicated at $g, g$, may connect the respective rib ends. The tail plane $h$ may similarly have its area increased by substantially triangular sections $h'$, $h'$ pivoted as at $h^2$ and capable of projection beyond the edges of the plane $h$ in substantially similar manner.

The actuating mechainsm whereby the sections $e, f$ and $h'$ may be reciprocated about the points of pivot $e'$, $f'$ and $h^2$ may take any desired form, and may actuate the front and rear movable sections simultaneously or independently as desired. A convenient type of actuating mechainsm is illustrated in connecton with the embodiment shown in Figures 4 through 10.

In the modification illustrated in Figure 4 the relatively stationary wing section is again indicated at $b$ and is formed with forwardly and rearwardly disposed recesses $b'$, $b^2$. In the lower surface of the wing extending in a fore and aft direction above and below the steering section are ribs $i, j$ which meet at the extreme outer portions as shown to form slots $k, k'$ therebetween at the front and rear edges, respectively, in prolongation of the recesses $b'$ and $b^2$. Within the recess $b'$, Figure 8, there is shown as disposed a flexible forwardly wing section $l$ (Figure 5) indicated as comprised of a plurality of articulated laterally extending members $l'$ connected together and adapted to slide in the groove $k$ and recess $b'$. Similarly a rearward flexible wing section $m$, Figure 5, formed of articulated portions $m'$ is shown as disposed within the groove $k'$ and recess $b^2$. The lower wing surface is indicated in Figures 4, 5 and 10 at $b^x$. The actuating means for the section may take any desired form and may function to reciprocate the forward and rearward sections either simultaneously or independently. A preferred type of mechanism is illustrated in the drawings. Rods $n, o$ connected respectively by means of bifurcated ends $n', o'$ to the forward and rearward edges are formed at their inner extremities with racks $n^2, o^2$ adapted to be engaged by pinions $n^3, o^3$, respectively carried upon parallel shafts $n^4, o^4$ extending throughout and terminating adjacent the fuselage for rotation by the pilot of the machine whereby the desired lifting surface may be attained.

If the front and rear movable sections are adapted to be actuated simultaneously the shaft $n^4$, for instance, may be extended to the fuselage while independent short shaft sections $o^4$, Figure 6, may be journaled in a housing $p$ and may carry a pinion $o^5$ meshing with a pinion $o^3$ whereby rotation of the shaft $o^4$ is effected. By this construction counterclockwise rotaton of say the pinion $n^3$ may be effected to cause the retraction of the rack $n^2$ and thereby the leading wing section $l$ and the clockwise rotaton of the pinion $o^3$ to cause retraction of the rack $o^2$ and thereby the retraction of the trailing section $m$.

Figure 7 illustrates one manner in which the ribs may be disposed to form guides for the respective sections. Rib $j$ is recessed as at $j'$ upon opposed sides to form the grooves $k'$ or $K'$ as the case may be. Recesses of varying depth may also be formed upon opposite sides of the rib $j$ to receive plates $q$ which serve as track-ways for angle shaped members $r$ secured to the wing sections $l$.

It is to be understood in connection with the modification just described that there are disposed along the wing in a transverse direction a plurality of the ribs $i, k$, suitably spaced and adapted to have reciprocate therebetween, movable sections $l$, as shown in Figures 5 and 7. By the construction just described the forward and rear sections $l$ and and $m$ may be reciprocated simultaneously and by the shape of the grooves $k, k'$ the position of the leading and trailing edges may always be determined. For instance, when the forward and rear sections are fully retracted the leading and trailing edges may be disposed in the plane indicated by the line $x$ in Figure 4. By the synchronized actuating devices described the forward and rearward movable sections may be protracted simultaneously in such relation that the leading and trailing edges always lie in a plane parallel to the plane $x, x$ such as, for instance, the plane $y, y$, whereby the angle of incidence of the wing as a whole is maintained constant.

It will thus be seen that a supporting surface for an aeroplane has been provided wherein is permitted a variation in the area and camber of the wing surface while the angle of incidence is maintained constant.

Various combinations of the embodiment illustrated in increased drawings and hereinbefore described may be availed of in carrying out the invention and no limitation is intended by the ship and/or arrangement of parts or the means for their actuation except as indicated in the accompanying claims.

What I claim is:

1. In a supporting surface for an aeroplane, a relatively stationary section, a forwardly disposed slidable section pivotally connected to the stationary section and rearwardly disposed slidable section pivotally connected to the stationary section, and means to move said sections with respect to the pivot to maintain the angle of incidence of the wing constant.

2. In combination, an aircraft wing, comprising a relatively stationary section, a forwardly disposed section, a rearwardly disposed section, a stabilizer comprising a relatively stationary section, and a relatively movable section, and means to move said movable sections with respect to the stationary sections simultaneously while maintaining the angle of incidence constant.

3. In combination, an aircraft wing, comprising a relatively stationary section, a forwardly disposed section, a rearwardly disposed section, a stabilizer comprising a relatively stationary section and a relatively movable section, and means to move said movable sections with respect to the sections synchronously while maintaining the angle of incidence constant.

4. In a supporting surface for an aeroplane, in combination, a relatively stationary section, a forwardly disposed section pivotally connected to the stationary section at its outer extremity, a rearwardly disposed section pivotally connected to the stationary section at its outer extremity, a section slidable with respect to the stationary section adjacent the pivoted section and movable forwardly of the stationary section and a slidable section adjacent the pivoted section and movable rearwardly of the stationary section and means to move said sections with respect to the stationary sections.

5. In a supporting surface for an aeroplane, in combination, a relatively stationary section, a forwardly disposed section pivotally connected to the stationary section at its outer extremity, a rearwardly disposed section pivotally connected to the stationary section at its outer extremity, a section slidable with respect to the stationary section adjacent the pivoted section and movable forwardly of the stationary section and a slidable section adjacent the pivoted section and movable rearwardly of the stationary section, means to move said sections with respect to the stationary sections and means to maintain the angle of incidence of the wing constant.

6. In a supporting surface for an aeroplane, in combination, a relatively stationary section, a forwardly disposed section pivotally connected to the stationary section at its outer extremity, a rearwardly disposed section pivotally connected to the stationary section at its outer extremity, a plurality of stationary sections slidable with respect to the stationary section adjacent the pivoted section and movable forwardly of the stationary section, a plurality of slidable sections adjacent the pivoted section and movable rearwardly of the stationary section and means to move said plurality of sections with respect to the stationary section.

7. In an aircraft wing, in combination, a relatively stationary wing section, a plurality of forwardly disposed sections, a plurality of rearwardly disposed sections, means to move said sections relatively to the stationary sections in a predetermined manner to maintain the angle of incidence of the wing constant, and a plurality of guiding means for said movable sections extending in a fore and aft direction and between which said sections move.

8. In an aircraft wing, in combination, a relatively stationary section, a plurality of forwardly disposed sections, a plurality of rearwardly disposed sections, means to move said sections with respect to the stationary section, a plurality of guides for said movable sections disposed in fore and aft direction and between which the sections move, and means to maintain the angle of incidence of the wing constant.

9. In an aircraft wing, in combination, a relatively stationary wing section, a forwardly disposed section, a rearwardly disposed section, means to move said sections relatively to the stationary section, and guiding means for said movable sections extending in a fore and aft direction between which the wing sections move.

10. In a supporting surface for an aeroplane, in combination, a relatively stationary section, a forwardly disposed section pivotally connected to the stationary section, a section slidable with respect to the stationary section adjacent the pivoted section and movable forwardly of the stationary section and means to move said sections with respect to the stationary section.

11. In a supporting surface for an aeroplane, in combination, a relatively stationary section, a forwardly disposed section pivotally connected to the stationary section at its outer extremity, a section slidable with respect to the stationary section adjacent the pivoted section and movable forwardly of the stationary section and means to move said sections with respect to the stationary section.

12. In a supporting surface for an aeroplane, in combination, a relatively stationary section, a forwardly disposed section pivotally connected to the stationary section at its outer extremity, a plurality of movable sections slidable with respect to the stationary section adjacent the pivoted section and movable forwardly of the stationary section and means to move said plurality of sections with respect to the stationary section.

13. In an aircraft wing, in combination, a relatively stationary wing section whereof an under edge surface is recessed with respect to the remaining under surface of the wing section, and a wing section adjustably movable between a position within said recessed wing surface and a position from under said recessed surface.

14. In an aircraft wing, in combination, a relatively stationary wing section whereof the front under edge surface is recessed with respect to the remaining under surface of the wing section, and a wing section adjustably movable between a position within said recessed wing surface and a position forwardly of said recessed surface.

15. In an aircraft wing, in combination, a relatively stationary wing section, a plurality of pairs of vertically spaced ribs extending in a fore and aft direction from one edge of said stationary wing section and a movable section guided by said ribs.

16. In an aircraft wing, in combination, a relatively stationary wing section, a plurality of pairs of vertically spaced curved ribs extending in a fore and aft direction from one edge of said stationary wing section and a movable flexible section guided by said ribs.

17. In an aircraft wing, in combination, a relatively stationary wing section, a plurality of slotted guides carried by an edge of said wing section and extending in a fore and aft direction and a wing section supported in the slots and movable in respect of the stationary section.

18. In an aircraft wing, in combination, a relatively stationary wing section, a plurality of slotted guides carried by an edge of said wing section and extending in a fore and aft direction, a wing section supported in the slots and movable in respect of the stationary section and means to adjustably move said second named wing section.

19. In an aircraft wing, in combination, a relatively stationary wing section whereof an under edge surface is recessed with respect to the remaining under surface of said section, a plurality of guides formed with curved slots carried with said edge and exteding in a fore and aft direction, a wing section supported in said slots and movable from within said recess to a point therewithout.

20. In an aircraft wing, in combination, a relatively stationary wing section whereof the under surface of the leading and trailing edges are recessed with respect to the remaining under surface of said wing section, a plurality of spaced guides carried with said leading and trailing edges, and extending in fore and aft directions and formed with downwardly curved slots, flexible wing sections supported in the slots and movable from within said recesses to a point therewithout and means to move said flexible wing sections with respect to said relatively stationary wing section to maintain the angle of incidence constant while varying the camber and area of the wing.

This specification signed this 26th day of October, A. D. 1925.

JONATHAN P. GLASBY, Jr.

slots and movable in respect of the stationary section and means to adjustably move said second named wing section.

19. In an aircraft wing, in combination, a relatively stationary wing section whereof an under edge surface is recessed with respect to the remaining under surface of said section, a plurality of guides formed with curved slots carried with said edge and exteding in a fore and aft direction, a wing section supported in said slots and movable from within said recess to a point therewithout.

20. In an aircraft wing, in combination, a relatively stationary wing section whereof the under surface of the leading and trailing edges are recessed with respect to the remaining under surface of said wing section, a plurality of spaced guides carried with said leading and trailing edges, and extending in fore and aft directions and formed with downwardly curved slots, flexible wing sections supported in the slots and movable from within said recesses to a point therewithout and means to move said flexible wing sections with respect to said relatively stationary wing section to maintain the angle of incidence constant while varying the camber and area of the wing.

This specification signed this 26th day of October, A. D. 1925.

JONATHAN P. GLASBY, Jr.

CERTIFICATE OF CORRECTION.

Patent No. 1,786,236.                    Granted December 23, 1930, to

JONATHAN P. GLASBY, JR.

It is hereby certified that error appears in the printed specification of the above numbered patent requiring correction as follows: Page 4, line 121, claim 17, and line 128, claim 18, for "by" read with; and that the said Letters Patent should be read with these corrections therein that the same may conform to the record of the case in the Patent Office.

Signed and sealed this 24th day of February, A. D. 1931.

(Seal)

M. J. Moore,
Acting Commissioner of Patents.

CERTIFICATE OF CORRECTION.

Patent No. 1,786,236.  Granted December 23, 1930, to

JONATHAN P. GLASBY, JR.

It is hereby certified that error appears in the printed specification of the above numbered patent requiring correction as follows: Page 4, line 121, claim 17, and line 128, claim 18, for "by" read with; and that the said Letters Patent should be read with these corrections therein that the same may conform to the record of the case in the Patent Office.

Signed and sealed this 24th day of February, A. D. 1931.

(Seal)

M. J. Moore,
Acting Commissioner of Patents.